United States Patent [19]
Polyakov et al.

[11] 4,346,003
[45] Aug. 24, 1982

[54] MASH-SEPARATING FILTER-PRESS

[76] Inventors: Nikolai F. Polyakov, ulitsa Yabluneva, 24; Leonid M. Ryabchenjuk, ulitsa Entuziastov, 11/1a, kv. 41; Nina A. Emelyanova, ulitsa Sechenova, 3, kv. 56; Georgy T. Sulim, prospekt Mira, 8, kv. 24; Vladimir A. Kobzar, ulitsa Krasnozvezdnaya, 5, kv. 37; Stanislav R. Peresunko, ulitsa Smirnova-Lastochkina, 3/5, kv. 47; Anatoly I. Sokolenko, pereulok Guchny, 2a, kv. 1; Oleg V. Ivanenko, ulitsa Sechenova, 3, kv. 56, all of Kiev, U.S.S.R.

[21] Appl. No.: 203,346
[22] Filed: Nov. 3, 1980
[51] Int. Cl.³ .............................................. B01D 25/12
[52] U.S. Cl. .................................. 210/225; 100/109; 100/197; 100/203; 210/400
[58] Field of Search ............... 210/224, 225, 297, 332, 210/350, 391, 400, 401; 100/109, 196, 197, 199, 203, 205, 206

[56] References Cited
U.S. PATENT DOCUMENTS

| | | | |
|---|---|---|---|
| 1,259,032 | 3/1918 | Merrill | 210/225 |
| 2,512,365 | 6/1950 | Muller | 210/225 |
| 3,342,123 | 9/1967 | Ermakov et al. | 210/225 |
| 3,471,024 | 10/1969 | Doycef | 210/225 |
| 3,583,566 | 6/1971 | Meshengisser et al. | 210/225 |
| 3,655,055 | 4/1972 | Egdom | 210/225 |
| 3,968,040 | 7/1976 | Ostlop | 210/225 |
| 4,142,933 | 3/1979 | Graham | 210/225 |
| 4,172,790 | 10/1979 | Tybo | 210/224 |
| 4,274,961 | 6/1981 | Hirs | 210/225 |
| 4,292,173 | 9/1981 | Pakmentier | 210/225 |

OTHER PUBLICATIONS
Chernobylskiy, "Mashinostroenie," Moskva, 1975, pp. 44-46.

Primary Examiner—Peter A. Hruskoci
Attorney, Agent, or Firm—Steinberg & Raskin

[57] ABSTRACT

The filter-press includes a framework having vertical guides. On the upper ends of the vertical guides is horizontally secured a stationary thrust plate. On the same vertical guides are horizontally mounted a movable pressure platen connected with a reciprocating drive and being capable of vertically moving along said guides, as well as filter plates and frames disposed above each other between the thrust plate and the pressure platen, with the frames being located each between the neighboring filter plates. Each filter plate has vertical side boards, a sieve fixed on the upper butt ends of the side boards and a sieve fixed on the lower butt ends thereof. Mounted on the side boards between the sieves is a horizontal partition dividing the inner space of the filter plate into an upper cavity and a lower cavity. Between said frames and filter plates is passed in zigzags an endless filter band connected with a stepping drive and running round each filter plate from above and from below. Communicated with the cavities of the frames is a mash supply collector, and communicated with the cavities of the filter plates is at least one wort withdrawal collector. In the side boards of each filter plate are formed ducts communicating its lower and upper cavities with means for delivering and withdrawing sparge water.

8 Claims, 12 Drawing Figures

MASH-SEPARATING FILTER-PRESS

BACKGROUND OF THE INVENTION

1. Field of the Invention

The present invention relates to equipment for separating the wort from the spent grains, and more specifically to a filter-press for separating the mash. Most efficiently this invention can be used in brewing.

When improving the existing or designing new mash-separating equipment efforts are made to decrease the duration of the process of separating the wort from undermodified malt grain and remove as much as possible of soluble extracts from the spent grains. However, this urgent problem still remains to be solved, which is evidenced by the fact that the separation of the mash by the existing equipment takes from 1.5 to 2 times more time than the preparation of the mash. This disproportion can be eliminated in the existing apparatus either by increasing the filtering area, through increasing the size of the separating means or at the expense of incomplete extraction of the soluble extracts, which cannot be considered as an adequate solution of the problem.

2. Prior Art

Until the present time most breweries have made use of filter vats (cf. for instance, Nazarov i dr., Technologiya i oborudobanie pistchevyh priozvodstv, "Pistchevaya promyshlennost", M., 1977 p. 249) made in the form of a hollow cylinder having a bottom with openings and a level sieve placed thereover. Communicated with these openings are pipes for withdrawal of the wort. The mash is fed into the filtering vat so that the layer of spent grains on the sieve is from 30 to 45 cm thick. In case the depth of this layer is greater than indicated one, the filtration proceeds much slower and the spent grains are inadequately leached. If the depth of the layer of the spent grains is below the indicated value, this layer will not serve as a filter bed, which results in a poor filtration and the wort gets hazy as a result of that small particles of the coarsely ground malt get thereinto.

Therefore the filter vats generally have a height of not more than 2 m, and a diameter from 3 to 6 m. They take a great deal of room but have a rather low efficiency. This efficiency can be improved only at the expense of a larger size of such vats (namely their diameters). The filtering area of the filter vats have been considerably increased by the introduction of additional vertical sieves (cf. USSR Inventor's Certificate No. 392,088; Veselov I. Y. and Tchumasova M. A. Tehnologiya piva, "Pishchepromizdat," M. 1963, p. 262), which, however affected the quality of the wort. This is explained by that the sieves do not practically trap small particles which, as a result, get into the wort. To separate these particles it is necessary to form a filter bed of spent grains, which filter bed cannot be formed on the vertical sieves. Therefore, filtering through the sieve portions located above the filter bed surface is unwanted since it may cause turbidity of the wort.

Attempts have been made to use for separating the mash the drum suction filters (cf. FRG Pat. No. 1,254,566). It was believed that the drum suction filter would promote intensification of the separation process. This equipment, however, has not found wide application in brewing, which is explained by the fact that frequent chocking up of the filtering material and insufficient leaching, of spent grains.

There has been also a trend to effect separating of mash by means of filtering and settling centrifuges (cf. FRG Pat. No. 1,067,395). However, attempts to obtain a bright wort by centrifugal separation have not been successful so far. It is worth noting that recently many modern breweries (Tuborg in Denmark and others) have been again equipped during their reconstruction with filter vats.

Along with the above-mentioned equipment extensive use has been made recently of filter-presses (cf. for instance, Veselov I. Y. i Tchumakova M. A. Tehnologiya piva, "Pishchepromizdat," M., 1963, p. 267-270). A filter-press of this type comprises a base having vertical supports carrying horizontal guides secured thereto. Mounted on the horizontal guides are vertically positioned filter plates and frames. Between each filter plate and the frame adjacent thereto are disposed filter blankets made from a filter cloth. Each filter plate has one corrugated surface whereupon the filter blankets are placed. The frame cavities are communicated with a mash supply collector. The corrugation flutes form vertical ducts communicated with a wort withdrawal collector. The filter-press is also fitted with a hydraulic means for tightening the filter plates and frames to form a filter stack, as well as a means for supplying and withdrawing sparge water. When the mash is passed into the cavities of the filter frames the malt grains and coagulate settle down on the filter blankets to form a 6-7 cm bed. The wort is passed through the bed of malt grains and filter cloth to the vertical ducts formed by the flutes and then withdrawn through the collector. After the filtration of the first wort is completed the malt grains are subjected to the leaching which is effected by supplying the sparge water to the ducts in the filter plates, which sparge water being heated to a temperature of 78°-80°. The wort passing through the bed of malt grains and the cloth of the blankets gets into the vertical ducts and then is withdrawn through the collector. The sparge water, while passing through the bed of the malt grains and the blankets, washes out soluble extracts and then is added back to the first filtered wort. The leaching process is kept running until the density of the sparge water is lowered to a required value. Thereafter, the filter plates and frames are drawn apart by moving them by hand along the horizontal guides. The filter blankets are removed through the openings formed between the frames and plates after the latter have been drawn apart. The cavities of the filter frame are cleaned from the spent grains and the filter cloth of the blankets is washed to remove the dregs.

The advantage of the above filter-press over the filter vats lies in that having a much smaller cross section as compared with the latter it provides for a higher efficiency due to the fact that it has a larger filtering area. In addition, a filter-press permits processing more finely ground malt, thereby making it possible to increase a yield of the extract, and to utilize a greater amount of non-malt materials which affect filtration process in the filter vats.

Nevertheless, operating such filter-presses is associated with a number of difficulties. In particular heavy cast-iron plates and frames are handled by hand. Besides, cleaning of the frame cavities and replacing of a great number of the filter blankets take too much time.

There is known a filter-press wherein all these operations are mechanized (ref. Chernobylskiy I. I. i dr. Mashiny i apparaty khimicheskih proizvodstv, "Mashinostroenie," Moskva, 1975, pp. 44–46). This filter-press comprises a framework having vertical guides. Mounted in a horizontal position on the upper ends of the guides is a thrust plate. On the same guides is secured in a horizontal position a movable pressure platen connected with a reciprocating drive. Between the thrust plate and the pressure platen on the vertical guides are also positioned filter plates. These filter plates are mounted horizontally above each other. Each filter plate has side boards and a horizontal partition fixed to the lower butt ends of said side boards, whereas fixed to the upper butt ends of the side boards is a sieve. Thus, said side boards, the horizontal partition and the sieve define an inner space of the filter plate. On the vertical guides between the filter plates are also installed in a horizontal position frames. Between the filter plates and the frames is passed in zig-zags an endless filter band. Each loop, of the filter band is passed round the frame and the filter plate located thereabove. The endless filter band is connected with a stepping drive and runs through a cleaning chamber. Communicated with the cavities of the frames is a mash supply collector, whereas connected with the cavities of the filter plates is a wort withdrawal collector. The filter-press also includes a means for delivering and withdrawing sparge water. This means includes a valve box having valves to cut off the mash supply and let the sparge water pass to the frame cavities. The sparge water containing the extract of the molt grain is withdrawn from the filter frame cavities through the wort withdrawal collector. In the upper part of each frame there is located a membrane for pressing the settling.

It is quite obvious that the above-filter-press has a number of advantages over the aforecited appraratus, which advantages are the following: first, displacing and tightening the filter plates and the frames are effected by a special reciprocating drive; second, replacing the filtering cloth and removing the dregs are done by moving the endless filter band driven by a stepping drive; third, the dregs settle down by gravity, since the frames are oriented horizontally. All these factors provide for a higher efficiency of the filter-press. Nevertheless, in practice, operating this filter-press was associated with a number of difficulties. It has been established, for instance, that the sparge water at the first stage of the leaching process locally washes off the malt grain bed, which results in that the sparge water passes through the washout zones without removing the extract from the larger part of the malt grains. Furthermore, pressing the malt grains by the membrane results in that a great deal of suspended particles get into the wort. Attempts to eliminate these disadvantages have not yielded appreciable results, which is responsible for that the above filter-press has not gained wide application in brewing.

SUMMARY OF THE INVENTION

The main object of the present invention is to provide a filter-press featuring a higher efficiency than the prior art apparatus and smaller size.

Another object of the invention is to provide a filter-press wherein a local washing-out of the malt grain bed during the process of leaching is eliminated.

Still another object of the invention is to increase the yield of the soluble extracts of the spent grain.

A further object of the invention is to prevent the coagulate and malt grains from being carried away by the sparge water.

These and other objects of the invention are attained in a mash-separating filter-press comprising a framework having vertical guides, a stationary thrust plate fixed in a horizontal position on the upper ends of said vertical guides, a movable pressure platen mounted in a horizontal position for vertical movement along the vertical guides and connected with a reciprocating drive, filter plates mounted horizontally above each other on said vertical guides between the thrust plate and the pressure platen, and including vertical side boards, sieves fixed on the upper butt ends of the side boards, and horizontal partitions defining inner cavities of the filter plates, frames each being mounted horizontally on the vertical guides between the neighbouring filter plates, an endless filter band passed in zigzags between said frames and filter plates, a filter band stepping drive, a mash supply collector communicated with the cavities of the frames, at least one wort withdrawing collector communicated with the cavities of the filter plates, and means for supplying and withdrawing sparge water, wherein according to the invention each filter plate further includes a sieve fixed to the lower butt ends of the side boards, and the horizontal partition is secured to the side boards between the sieves so that the inner-space of the filter plate is divided into an upper cavity and a lower cavity each being communicated with the wort withdrawing collector, the endless filter band being passed round each filter plate from above and from below, and the side boards of each filter plate have ducts formed therein, which ducts communicating the lower and the upper cavity of the filter plate with the means for supplying and withdrawing the sparge water.

Such construction allows the filtration and withdrawal of the wort to be effected both through the upper and the lower sieve of each filter plate. As a result, with the same size of the filter-press the efficiency thereof is two times higher than that of the prior art apparatus. Furthermore, the sparge water is passed into the cavities of the filter plates through the sieves, which promotes its uniform distribution over the whole surface of each spent grain bed on the one hand, and a fuller extraction of the extracts from the spent grains on the other. At the same time a higher intensity of the leaching process rules out the necessity of squeezing out the spent grain, thereby eliminating the cause of the turbidity of the wort.

With such arrangement of the filter band the most convenient opening of the stack of the filter plates and frames is ensured by the embodiment wherein the frames and filter plates are suspended from the thrust plate and connected with each other by means of rods increasing stepwise and downwardly in diameter and passed through openings in the frames and filter plates.

In order to decrease the weight of the filter-press it is expedient that the frames and filter plates have lugs provided with openings for the rods to be passed through.

It is also advisable that the filter-press include two wort withdrawal collectors respectively communicated with the upper and lower cavity of the filter plates and connected with means for supplying and withdrawing of the sparge water. This will allow supplying sparge water alternately from above and from below thereby improving the process of washing out the spent grains.

The best result in leaching of the malt grain is achieved in the filter-press modification wherein in the lower cavity of each filter plate on the horizontal partition are mounted vertical sheets defining together with the sieve, horizontal partition and side boards a labyrinth duct. Such construction permits the pressure field and the velocity of the sparge water flow to be equalized over the whole surface of each bed of the malt grains.

In order to rule out sagging of the sieve and rupture of the endless filter band it is expedient to mount in the upper cavity of each filter plate on the horizontal partition a vertical props for the sieve to rest upon. Such construction of the filter-press ensures a uniform conditions for the filtration at different places of each sieve.

To provide for the best efficiency of the filter-press it is expedient that the thrust and the filter plate have vertical side boards facing the frames adjacent thereto and defining the cavities, said side boards having ducts made therein and intended for withdrawing the wort, as well as for supplying and withdrawing the sparge water, fixed on the butt ends of said side boards are sieves. This improves the leaching of the malt grains both in the upper and in the lower filter frames of the filter-press.

To widen the range of regulating the efficiency of the filter-press it is necessary to place between the thrust and the pressure platen at least two vertical stacks of the filter plates and frames. This will enable the efficiency of the filtering to be increased or decreased by varying the number of stacks of the filter plates and frames.

BRIEF DESCRIPTION OF THE DRAWINGS

The invention will now be explained in greater detail with reference to embodiments thereof which are represented in the accompanying drawings, wherein.

DETAILED DESCRIPTION OF THE INVENTION

A mash-separating filter-press comprises a framework 1 (FIG. 1), whereon are mounted vertical guides 2. On the upper ends of the vertical guides 2 is fixed in a horizontal position a stationary thrust plate 3, whereunder on the same vertical guides 2 is mounted a movable pressure platen 4 for vertical movement along the guides 2. There is also provided a reciprocating drive 5 mounted on the framework 1, and connected with the pressure platen 4. It will be apparent that the drive 5 may be variously constructed (as an actuating power cylinder, a rack-and-gear drive etc.). Hereinafter the proposed filter-press will be described having a screw-and-lever drive 5, which comprises an electric motor 6, whose output shaft is connected to a drive screw 7 having a right-hand thread and a left hand thread. Geared with the drive screw 7 are split nuts 8 and 9. To each split nut 8 and 9 are pivoted levers 10, 11 and 12, 13 respectively. The levers 11 and 13 are hinged to the framework 1, whereas the levers 10 and 12 are hinged to the pressure platen 4. Thus the levers 10, 11, 12 and 13 form a four-bar linkage along the diagonal of which is disposed a drive screw 7.

Figure 1:
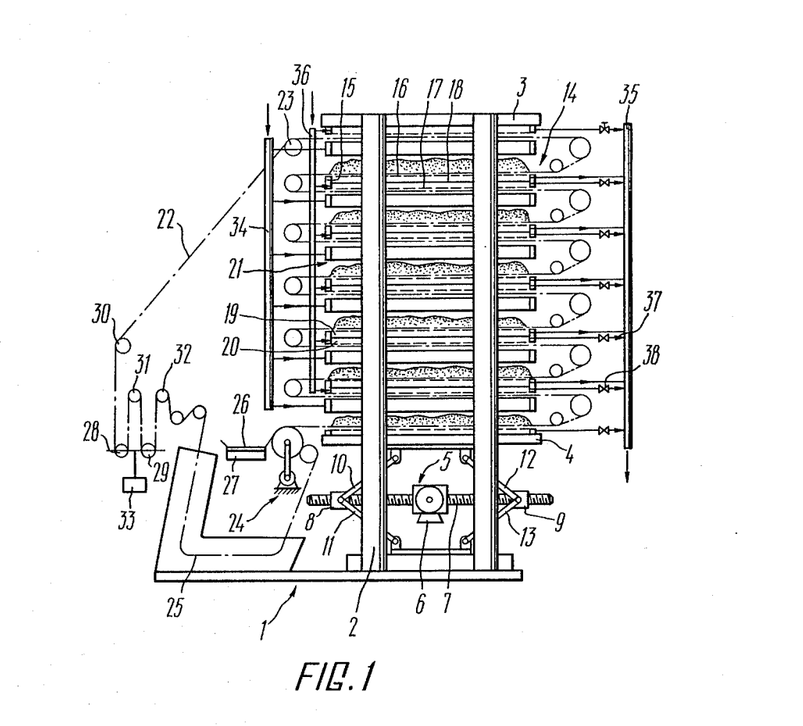
FIG. 1 is a general view of the proposed mash-separating filter-press.

Between the thrust plate 3 and the pressure platen 4 are horizontally disposed filter plates 14. The filter plates 14 are mounted above each other on said vertical guides 14 for vertical movement. Each filter plate has vertical side boards 15 located on the periphery thereof. Fixed on the upper butt ends of the side boards is a first sieve 16, and on the lower butt ends of the same side boards 15 is fixed a second sieve 17. Between the first sieve 16 and the second sieve 17 is disposed a horizontal partition 18 secured to the vertical side boards 15, which horizontal partition 18 divides the inner space of the filter plate 14 into an upper cavity 19 and a lower cavity 20.

On the vertical guides 2 between the filter plates 14 are mounted frames 21. Between the frames 21 and the filter plates 14 is arranged in zigzags an endless filter band 22 whose horizontal loops are passed round each filter plate 14 both from above and from below. The filter band 22 rests upon horizontal rolls 23 fixed to the framework 1, and runs through a cleaning chamber 25 adapated for continuously cleaning and washing the endless filter band 22. Mounted under the rolls 23 are a chute 26 and a conveyor 27 for withdrawing of dregs.

Before the entrance to the cleaning chamber 25 there are provided take-up loops formed by a pair of rolls 28 and 29 connected with each other and support rolls 30, 31 and 32 of the filter band 22. To the rollers 28 and 29 are suspended a take-up weight providing a constant tension of the filter band 22.

The endless filter band may be made from different woven materials, such as wire gauze, synthetic spongy materials reinforced with cord. Preferably the filter band is made from synthetic woven materials.

The filter press has a mash supply collector 34 communicated with the cavities of the frames 21. According to the invention the upper and lower cavities 19 and 20 of each filter plate 14 are communicated with a wort withdrawing collector 35. The filter-press also includes a means for delivering and withdrawing sparge water. The sparge water is delivered through a collector 36 communicated with the lower cavities 20 of the filter plates 14.

Withdrawing the sparge water is effected by the wort withdrawal collector 35. In the side boards 15 of the filter plate 14 there are provided ducts communicated with the said collectors 35 and 36.

In the above modification of the filter-press the connecting pipes 37 communicating the lower cavities 20 of the filter plates 14 with the collector 35 are fitted with valves 38.

Figure 2:
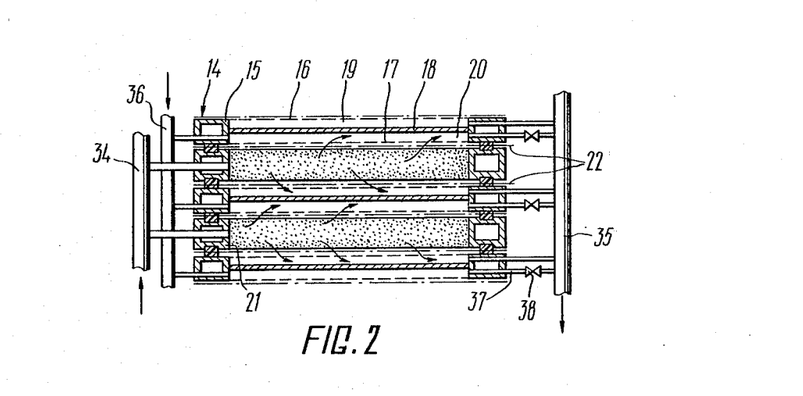
FIG. 2 is an elevation of a part of the vertical stack of the filter plates and frames in a squeezed condition.

Referring now to FIG. 2 of the accompanying drawings, illustrating the filter plates 14 and frames 21, each frame 21 has rubber sealing gaskets secured to the upper and the lower butt end thereof. To ensure the required rigidity with a minimal weight of the filter-press the vertical side boards of all the filter plates 14 and the body of all the frames 21 are made hollow.

The frame 21 and the filter plate 14 are suspended from the thrust plate 3 (FIG. 3) by means of rods 40 each increasing downwardly in diameter. It can be readily understood that the rods 40 may be passed through openings provided in the thrust plate 3, frame 21 and filter plate 14. In the preferred modification, however, the frame 21 and the filter plates 14 have lugs 41 and 42 having through openings for said rods 40 to be passed through. The diameter of the opening in the lug 41 of the frame 21 is larger than the diameter of the upper portion 43 of the rod 40 but is smaller than the diameter of the middle portion 44 thereof. The diameter of the opening in the lug 42 of the filter plate 14 is larger than the diameter of the middle portion 44 of the rod 40 but is smaller than the lower portion 45 thereof. The upper portion 44 of each rod 40 has a thread with a nut 46 screwed thereon above the thrust plate 3.

Figure 3:
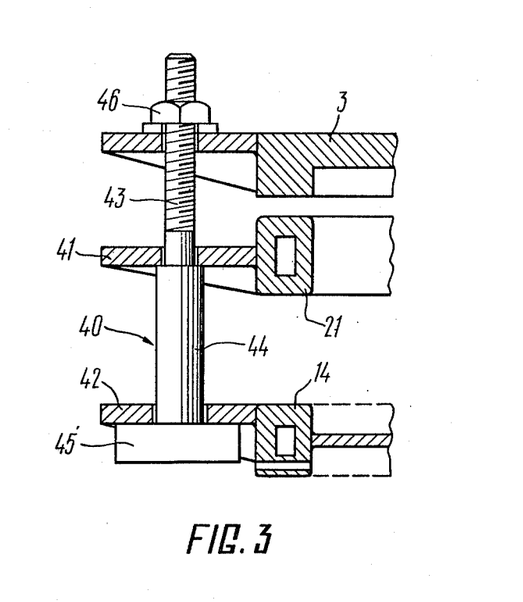
FIG. 3 is an elevation of a part of the vertical stack of the filter plates and frames connected by stepped rods.

The frames 21 and the frames 14 located below are suspended from each other by means of the rods 40 in a similar manner.

Figure 4:
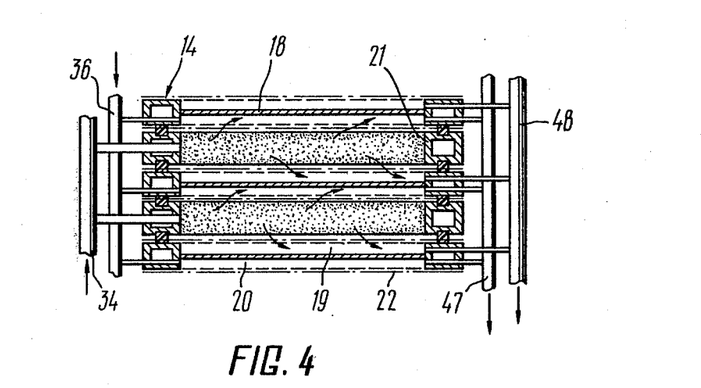
FIG. 4 shows a modification of the proposed filter-press fitted with two wort withdrawal collectors.

Shown in FIG. 4 is a modification of the filter-press having two wort withdrawing collectors. For the purpose of simplicity shown in this figure is only a part of the vertical stack of the filter plates and frames 21. According to this modification the proposed filter-press includes a collector 47 and a collector 48, both collectors being intended for withdrawing the wort. The collector 47 is communicated with the lower cavities 20 of the filter plates 14, and the collector 48 is communicated with the upper cavities 19 of the filter plates 14. Said collectors 47 and 48 are communicated with a means for delivering and withdrawing the sparge water. This modification of the filter-press allows the malt grains bed to be washed both from above and from below. It will be apparent that the process can be operable, if necessary, without the collector 36.

Figure 5:
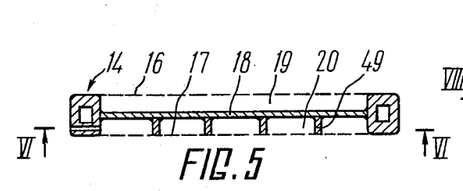
FIG. 5 shows a modification of the filter plate having in its lower cavity a labyrinth duct, elevational view.
Figure 6:
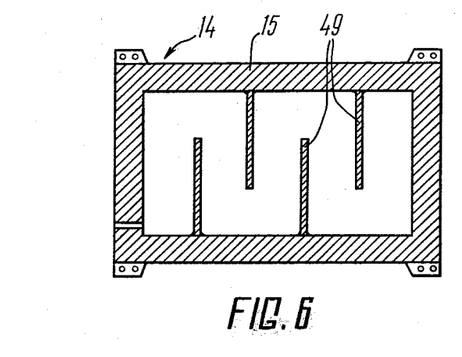
FIG. 6 is a sectional view of a modification of the filter plate, taken along line VI—VI in FIG. 5.

Shown in FIGS. 5 and 6 is a modification of the filter plate 14 wherein in the lower cavity thereof are mounted vertical sheets 49 secured to the horizontal partition 18. Each vertical sheet 49 has a length smaller than the distance between the opposite vertical side boards 15.

The vertical sheets 49 are mounted in a manner shown in FIG. 6 and together with the sieve 17, vertical board sides 15 and the horizontal partition 18 defines a labyrinth path.

Figure 7:
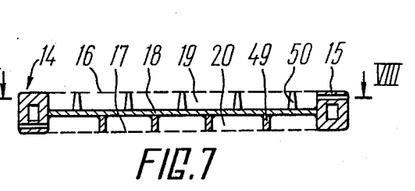
FIG. 7 shows a modification of the filter plate having vertical props in its upper cavity, elevational view.
Figure 8:
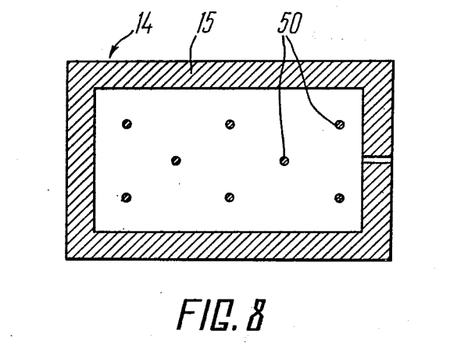
FIG. 8 is a sectional view of the filter plate, taken along line VIII—VIII of FIG. 7.

In the upper cavity 19 of each filter plate 14 (FIGS. 7 and 8) are mounted props 50 fixed to the horizontal partition 18 and uniformly distributed thereon, with the sieve 16 resting upon the upper ends of said props 50.

Figure 9:
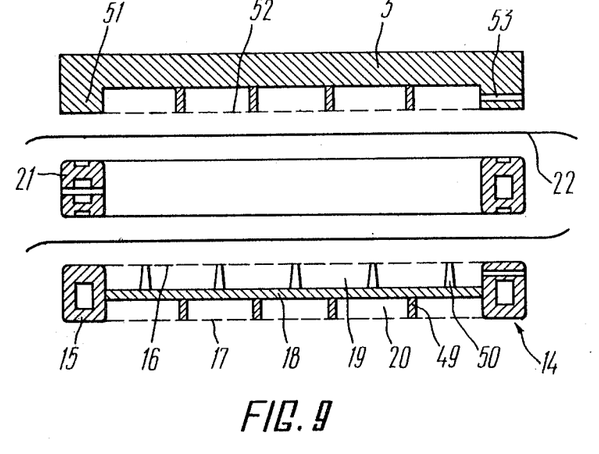
FIG. 9 is an elevation of the upper portion of the vertical stack of the filter plates and frames in a released condition and the thrust plate having vertical side boards.
Figure 10:
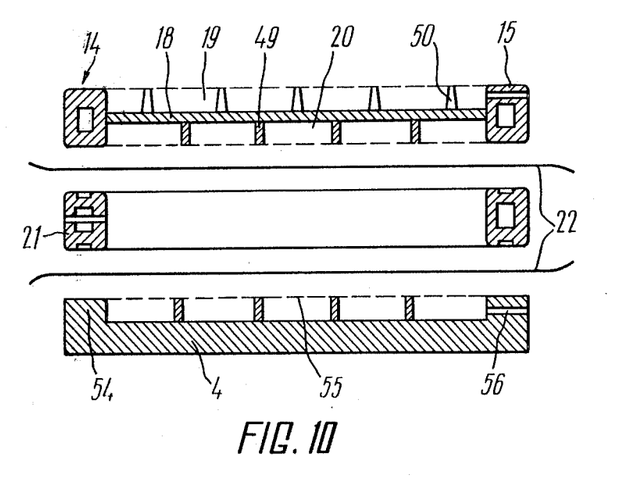
FIG. 10 is an elevation of the lower portion of the stack of the filter plates and frames in a released condition and the pressure platen having vertical side boards.

Referring now to FIGS. 9 and 10 illustrating a modification of the proposed filter-press permitting intensification of leaching of the spent grains both in the upper and lower frame 21, the thrust plate 3 (FIG. 9) has vertical side boards 51 facing the frame 21 adjacent thereto and the pressure platen 4 (FIG. 10) has side boards 54 facing the frame adjacent thereto. Mounted on the butt ends of the side boards 51 and 54 are sieves 52 and 55, respectively. In the side boards of the thrust plate 3 and pressure platen 4 are provided ducts 53 and 56 respectively adapted for withdrawing the wort and for delivering and discharging the sparge water.

Figure 11:
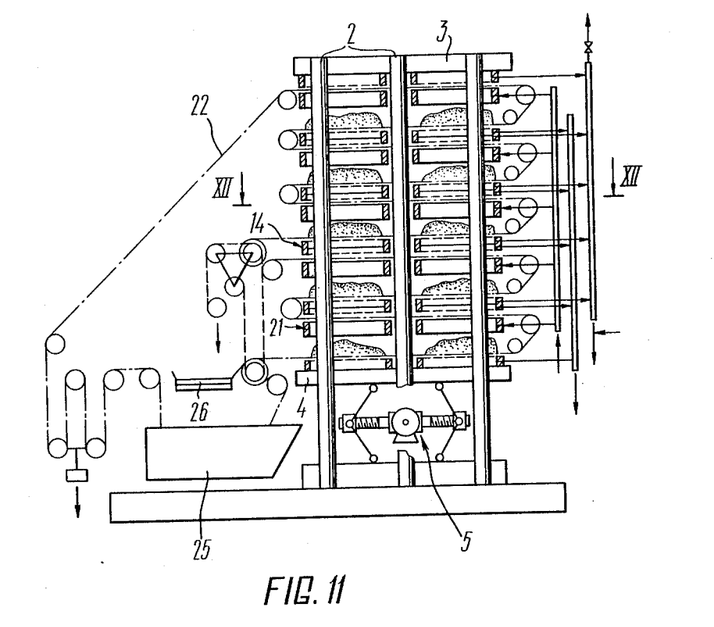
FIG. 11 diagrammatically represents one modification of the proposed filter-press having two vertical stacks of the filter plates and frames.

Shown in FIG. 11 is a modification of the proposed filter-press, wherein the efficiency thereof can be regulated in a wide range, which is achieved by that between the thrust plate 3 and the pressure platen 4 are disposed at least two vertical stacks of the filter plates 14 and the frames 21. The number of the vertical stacks may vary. However, whatever the number of these stacks the filter-press incorporates only one thrust plate 3, one pressure platen 4, one reciprocating drive 5 and one endless filter band 22. Basically, the construction of this filter-press is similar to that of the aforedescribed one.

Figure 12:
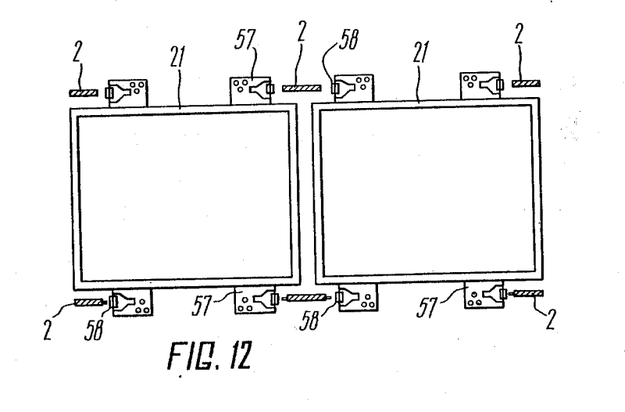
FIG. 12 is a sectional view of the proposed filter-press, taken along line XII—XII of FIG. 11.

As can be seen in FIG. 12 the frames 21 of each vertical stack are fitted with lugs 57. On these lugs are fixed in horizontal position rolls 58 being in contact with the vertical guides 2. Similarly, the filter plates 14 of each vertical stack are also provided with the lugs 57 and the rolls 58.

The proposed filter-press operates as follows.

The electric motor 6 (FIG. 1), when energized, rotates the drive screw 7 which in response moves the split nuts 8 and 9 toward each other, in which case the levers 10, 11, 12 and 13 rotate to lift the pressure platen 4 which moves the frames 21 and the filter plates 14 along the vertical guides 2 thereby pressing them against the thrust plate 3. When the stack of the filter plates and frames is in a squeezed condition the rubber sealing gaskets 39 (FIG. 2) hermetically seal in the cavities of the frames 21.

The mash is delivered to the collector 34 (FIG. 1) wherefrom it is supplied to the cavities of the frames 21. After the cavities are filled up the pressure therein is raised, and as a result there take place intense separation and filtration of the first wort. The first wort after having been separated from the mash is passed through the horizontal portions of the endless filter band 22 and through the sieves 16 and 17. Through the sieve 16 the wort passes into the upper cavities 19 and through the sieves 17 into the lower cavities of the filter plates 14. From the cavities 19 and 20 of the filter plates 14 the first wort is passed into the collector 35 and then is withdrawn from the filter-press, in which case the valves 38 are open.

As the mash is supplied the depth of the bed of the spent grains increases. When the cavities of the frames 21 are completely filled up with the malt grains the delivery of the mash is ceased, the moment when the cavities are filled up completely is determined by a sharp increase of the pressure in the collector 34. Thereafter, the valves 38 are closed and the hot sparge water is delivered through the collector 36 to the lower cavities 20 of the filter plates 14. The sparge water fills in the lower cavities 20 and through the openings in the sieves 17 and the horizontal portions of the endless filter band 22 passes to the cavities of the frames 21. While passing through the bed of the spent grains in these cavities the sparge water washes out the soluble extract. The sparge water containing extract passes through the filter band 22 and the sieves 16 into the upper cavities 19 of the filter plates 14 wherefrom thus filtered sparge water containing the extract is passed into the collector 35 and then is discharged from the filter-press. The sparge water supply is ceased when the amount of the extract contained therein does not exceed 0.5–1.0% by weight. Thereafter it is useful to deliver air into the collector 36, which air will force the rest of the sparge water from the collector and dry to some extent the leached spent grain.

Thereafter the electric motor 6 is reversed and rotates the drive screw in the opposite direction in which case the split nuts 8 and 9 are moved from each other causing levers 10, 11, 12 and 13 to rotate and thereby to move the pressure platen downward. Moved downward are also the filter plates 14 and frames 21. In this case, as can be seen in FIG. 3, the frames 21 and the filter plates 14 are moved down until they abut against shoulders formed at the upper ends of the middle portions 44 and of the lower portions 45 of the rods 40. When the filter plates 14 (FIG. 1) are moved down the horizontal sections of the filter band 22 also are caused to move down therewith. Thus the spent grains are fully removed from the cavities of the frames 21.

The filter plates and frames 21 lowered, the stepping drive is operated to move the filter band 22 by one step in which case the spent grains fall down on the chute 26 and are removed by the conveyer 27.

The constant tension of the filter band 22 during the filter plates 14 and frames 21 moving up and down is maintained by the take-up weight 33.

In the course of operation the filter band 22 moves through the cleaning chamber 25 wherein it is cleaned from the dregs and washed.

The modification of the proposed apparatus, shown in FIG. 4, operates in a manner similar to that disclosed above, except that the first wort from the upper cavities 19 of the filter plates 14 is passed into the collector 47. Leaching of the malt grains in the case of this modification can be effected in two different ways. The hot sparge water, as described above, may be delivered through the collector 36 into the lower cavities 20 of the filter plates 14, in which case the collector 47 must be shut off. In this case the sparge water will pass through the layer of the spent grains washing out the extracts therefrom, whereafter it gets into the upper cavities 19 and is withdrawn through the collector 48.

It is also possible to deliver the hot sparge water through the collector 48 into the upper cavities 19 of the filter plates 14, in which case the collector 36 must be shut off so that the sparge water, having been passed from the bottom upwards through the layer of the spent grains, is withdrawn from the lower cavities 20 of the filter plate 14 through the collector 47.

It will be apparent that the sparge water may be passed alternately through the layer of the spect grains, i.e. upwards and downwards.

An even distribution of the sparge water over the whole area of the spent grains settling is promoted by that according to the modification of the filter plate 14 shown in FIGS. 5 and 6 within the cavity 20 there is produced an additional hydraulic resistance caused by the labyrinth duct defined by the vertical partitions 49.

When the mash or sparge water is supplied, which causes the pressure within the cavities of the frames 21 to rise, the sieves 16 resting upon the props 50 (FIGS. 7 and 8) which prevent sagging of the 16 and thereby rule out a possible rupture of the filter band 22.

The proposed filter-press embodied as shown in FIGS. 9 and 10 operates, in general, as described above, except for that the first wort from the upper frame 21 is passed not only into the upper cavity 19 of the filter plate 14, but also into the cavity of the thrust plate 3, which cavity being defined by the vertical side boards 51 and the sieve 52. From this cavity the first wort is withdrawn through the duct 53, through which duct also is supplied or discharged the sparge water during leaching of the malt grains, which favours washing-out of the extract from the malt grains in the upper frame 21.

According to this modification of the filter-press the first wort from the lower frame 21 is passed not only into the lower cavity 20 of the filter plate 14 but also into the cavity of the pressure platen 4 defined by the vertical side boards 54 and the sieve 55. From this cavity the wort is withdrawn through the duct 56, through which duct also is supplied and withdrawn the sparge water during leaching of the malt grains, which promotes washing-out of the extracts from the malt grains in the lower frame 21.

The filter-press embodied as shown in FIG. 11 operates, in general, as disclosed above, except that this modification provides for varying in a wide range the efficiency of the proposed filter press, which is attained by varying, if necessary, the number of the vertical stacks of the filter plates 14 and frames 21.

Though the brewing is the main field of application of the proposed apparatus the latter also can be used for the production of yeast and in the sugar and the chemical industry.

It is to be understood that the form of the invention herewith shown and described, is to be taken as preferred embodiments, and the various changes in the shape, size and arrangement of parts may be resorted to, without departing from the spirit of the invention, or the scope of the claims below.

We claim:

1. A mash-separating filter-press comprising:
   (a) a framework;
   (b) vertical guides mounted on said framework;
   (c) a stationary thrust plate horizontally fixed on the upper ends of said vertical guides;
   (d) a movable pressure platen horizontally mounted on said vertical guides for movement therealong;
   (e) a reciprocating drive mounted on said framework and connected with said movable pressure platen;
   (g) a plurality of filter plates horizontally mounted above each other between said thrust plate and said pressure platen for vertical movement along said vertical guides, each said filter plate having:
   vertical side boards located on the periphery thereof having upper and lower butt ends spaced from each other;
   a first sieve fixed on the upper butt ends of said side boards;
   a second sieve fixed on the lower butt ends of said side boards;
   a horizontal partition fixed to said side boards between said sieves and dividing the inner space of the filter plate into an upper cavity and a lower cavity;
   (h) a plurality of frames mounted on said vertical guides for vertical movement therealong, each of said frames being situated between vertically adjacent filter plates and defining around the periphery a cavity;
   (i) an endless filter band passed in zigzags between said frames and filter plates so that said filter band runs round each said filter plate from above and from below;
   (j) a stepping drive mounted on said framework and connected with said endless filter band;
   (k) a mash supply collector communicated with the cavities of said frames;

(l) at least one wort withdrawal collector communicated with the upper and the lower cavity of each said filter plate;

(m) a means for supplying and discharging sparge water, communicated with the upper and the lower cavity of each said filter plate through ducts formed in said boards of each filter plate.

2. A filter-press as claimed in claim 1, wherein said frames and said filter plates are suspended from said thrust plate and connected with each other with the aid of rods increasing stepwise downwardly in diameter and being passed through openings provided in said frames and filter plates.

3. A filter-press as claimed in claim 2, wherein said frames and said filter plates are fitted with lugs having openings for said rods to be passed through.

4. A filter-press as claimed in claim 1, which includes two said wort withdrawal collectors respectively communicated with the upper and the lower cavities of said filter plates and connected with said means for delivering and withdrawing sparge water.

5. A filter-press as claimed in claim 1, wherein in the lower cavity of each said filter plate on said horizontal partition are fixed vertical sheets defining together with said sieve, horizontal partition and side boards a labyrinth duct.

6. A filter-press as claimed in claim 1, wherein on said horizontal partition in the upper cavity of each said filter plate are fixed props carrying said sieve.

7. A filter-press as claimed in claim 1, wherein said thrust plate and said pressure platen are provided with vertical side boards facing said frames adjacent thereto and defining cavities, said side boards having ducts formed therein for delivering and withdrawing sparge water, with said sieves being fixed on the butt ends of said side boards.

8. A filter-press as claimed in claim 1, wherein between said thrust plate and said pressure platen are mounted at least two vertical stacks of said filter plates and frames.

* * * * *